United States Patent

[11] 3,599,291

[72] Inventor John A. Alexander
  Painesville, Ohio
[21] Appl. No. 869,624
[22] Filed Oct. 27, 1969
[45] Patented Aug. 17, 1971
[73] Assignee TRW Inc.
  Cleveland, Ohio

[54] FILAMENT LAMELLAE FORMING APPARATUS
5 Claims, 3 Drawing Figs.

[52] U.S. Cl. ........................................................ 18/30 WM,
  18/36, 264/277, 18/30 Y, 18/DIG. 38, 18/DIG. 55,
  18/DIG. 30
[51] Int. Cl. .............................................................. B29f 1/022
[50] Field of Search ............................................ 18/30 R, 30
  WC, DIG. 10, DIG. 30, DIG. 38, DIG. 55, 36, 30
  WN, 30 E, 30 GA, 30 Y, 264/277; 25/118 H

[56] References Cited
UNITED STATES PATENTS
| | | | |
|---|---|---|---|
| 3,127,457 | 3/1964 | DiPinto | 264/54 |
| 3,148,431 | 9/1964 | Berliner | 25/11 |
| 3,296,055 | 1/1967 | Wilkens | 18/36 |
| 3,257,709 | 6/1966 | Fernan et al. | 18/36 X |

*Primary Examiner*—J. Spencer Overholser
*Assistant Examiner*—David S. Safran
*Attorney*—Hill, Sherman, Meroni, Gross & Simpson ABSTRACT: Filament-reinforced lamellae for fabricating composite turbine blades are made by feeding filaments into matched grooves formed in the faces of a split die having a contour corresponding exactly to that of the desired lamella form. The distance to which the individual reinforcing filaments are inserted into the die block is determined by wire stop elements inserted from the opposite end. After the reinforcing filaments are properly placed the stop wires are removed and molten or liquid resin is injected between the die faces to bind the filaments together into a ply. The die is then heated to cure or chilled to solidify the resin or binder, the filaments are sheared and the ply lamella is ejected from the mold.

A machine feeds the reinforcing filaments into the grooves between the die faces after the wire stops have been positioned from the opposite end. The machine removes the wire stops and injects the molten or liquid resin or binder, solidifies the resin or binder in the closed mold, shears the filaments after solidification and ejects the lamella from the mold.

PATENTED AUG17 1971
3,599,291
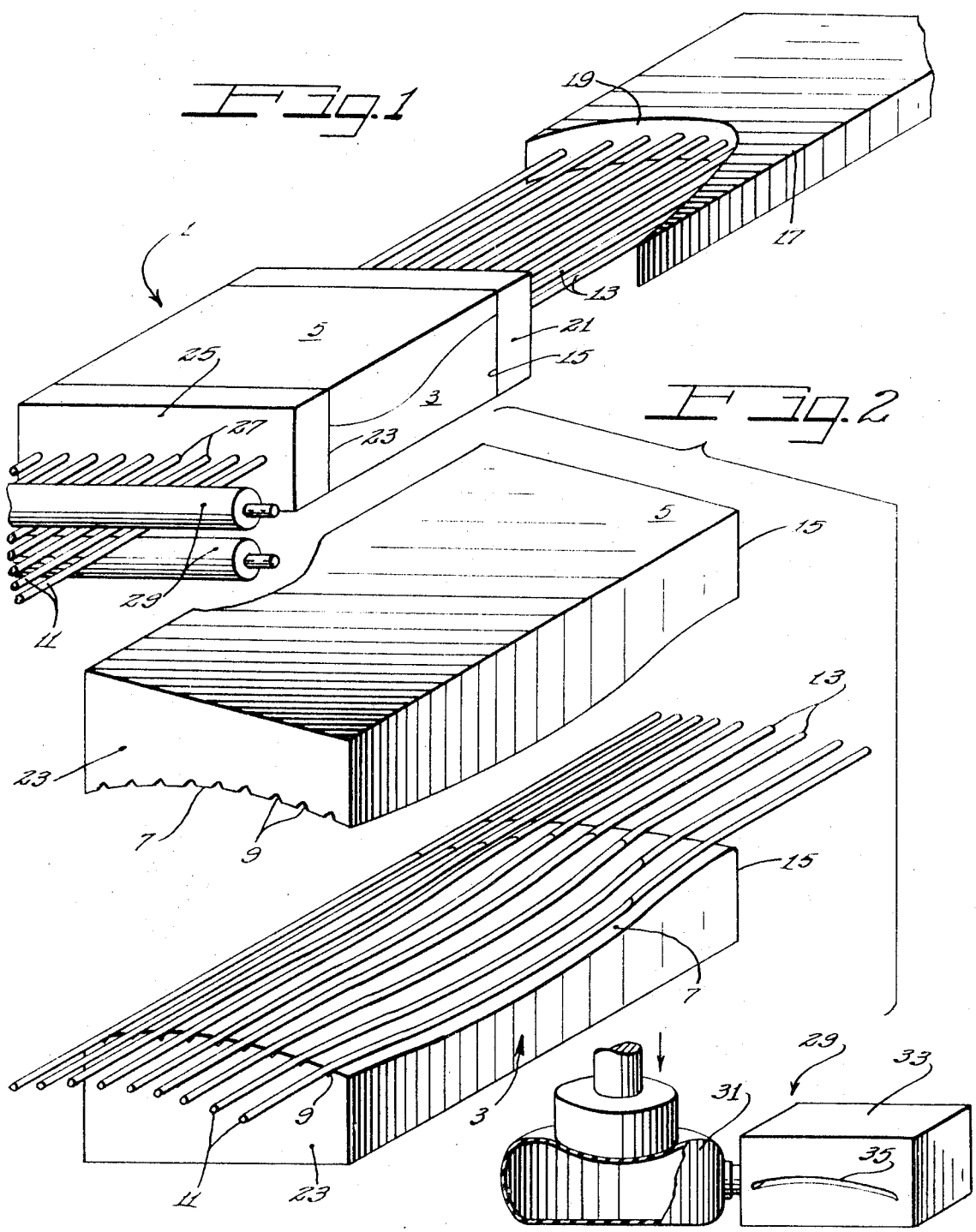
INVENTOR
John A. Alexander
BY ATTORNEYS

FILAMENT LAMELLAE FORMING APPARATUS

BACKGROUND OF THE INVENTION

The invention relates to a method and apparatus for fabricating blades particularly composite gas turbine engine blades. The current practice in the manufacture of such blades is to wind reinforcing filament on a drum in the desired spaced relationship and to bind the filaments while on the drum with a film or layer or binding material. When the binder has suitably hardened the reinforced layer is transversely cut to remove it from the drum and then cut into suitably sized rectangular mats which are then hot shaped on a ply form block and subsequently cut to the exact lamellae size and shape required for the hot pressure bonding into the finished blade. The filament-winding, mat-cutting, mat-forming and lamellae-cutting operations are laborious tasks which contribute significantly to the cost of fabricating complex irregular-shaped composite structural elements such as gas turbine engine blades.

SUMMARY OF THE INVENTION

It is an object of this invention to provide method and apparatus for economically fabricating filament-reinforced blades.

A further object of the invention is to provide method and apparatus for the direct formation of properly sized and shaped filament lamellae in a single or unitary operation.

In carrying out the invention a multiplicity of reinforcing filaments are fed into the spaced grooves of a split V-grooved die of the exact contour of the desired lamellae forms. Stiff wires are inserted into the grooves from the opposite end of the die to serve as stops for the reinforcing filaments and to define the exact shape of the successive lamellae. The wire stops are then removed and a molten, curable or solidifiable resin or binder is injected into the die to fill the die space of desired contour. The die is then cooled or heated for sufficient time and at the proper temperature to cure and/or harden the resin or binder. The reinforcing filaments are then sheared and the formed, shaped lamella is ejected from the mold.

BRIEF DESCRIPTION OF THE DRAWINGS

FIG. 1 is a perspective view of apparatus in accordance with the invention for feeding and positioning the reinforcing filaments in the die block;

FIG. 2 is a perspective view of the block with the two halves separated to show the contour of the matching faces; and FIG. 3 is a perspective view of an injection-molding assembly for injecting molten or liquid resin or binder into the die block.

DESCRIPTION OF THE PREFERRED EMBODIMENT

Referring to the drawing the numeral 1 indicates a die block formed of a lower half 3 and an upper half 5. The inner or matching faces 7 of the two halves of the die block are contoured to form a lamella of desired shape and size. A plurality of elongated parallel V-grooves 9 are formed in the matching faces of each half of the die block. The grooves may be spaced apart sufficiently to give a filament volume in the lamella of about 25 to 75 percent. The cross-sectional area of the V-grooves 9 is such as to allow the reinforcing filaments 11 to be fed into the die block when the die block is in assembled relationship and allow a slight clearance. A clearance of about one-fourth of the diameter of the filament is sufficient.

When the upper and lower halves of the die block are assembled in close relationship, the V-grooves on the two halves coincide with each other. In assembled relationship the contoured inner surfaces of the two die halves which define the lamella are spaced from each other sufficiently to permit injection of the plastic or resin binder. The spacing depends on the thickness of the lamella desired and may be from 0.001 to 0.125 inch or more. For example, when the reinforcing filament has a diameter of 4 mils, the spacing will be approximately 1 mil.

With the die block in assembled relationship as shown in FIG. 1, tungsten wire stops 13 are inserted into the grooves through the end 15. The ends of the stop wires 13 are arranged in a pattern to define the leading edge of the lamella. The shape of the leading edge is determined by the lamella profiler 17 against which the opposite ends of the stop wires are abutted. Since the stop wires are all of equal length the profile 19 will determine the shape of the profile defined by the ends of the stop wires inserted into the block. A wire stop feed guide 21 is provided having orifices which match the grooves 9 so that the wires can be fed through the orifices directly into the grooves. While I prefer to use tungsten wire stops, wire stops made of other metal may be used.

After the wire stop is in position, reinforcing filaments 11 are fed into the V-grooves from the opposite end 23 of the block 1. A filament feed block and shear 25 is provided having orifices 27 which coincide with the feed grooves in the block. The reinforcing filaments are fed by means of soft roll feeders 29 into the orifices 27 in the feed block 25 and then into the grooves in the die block, until they abut against the ends of the tungsten wire stops. The tungsten wire stops are then withdrawn from the block, the guide block 21 is removed, and the ejection-molding assembly 29 (FIG. 3) is placed against the end face 15 of the die block. The assembly 29 includes a pressure source 31 for the resin, and an injection block 33 receiving the resin from the source and having a discharge slot 35. Pressure is then applied to the liquid resin or binder source 31 so that it is forced through the slot 35 into the space between blocks 3 and 5 until it fills this lamella space and the groove space surrounding the reinforcing filaments. Resin may be any suitable material which can be solidified or heat cured to a hard material, such as polystyrene or the epoxy resin disclosed in U.S. Pat. No. 2,901,455.

After injection of the molten or liquid resin or binder into the die block, the die block is cooled to solidify the binder or heated to a suitable temperature and for a suitable length of time to cure it to the B stage. A suitable method of heating the die block is to implant electric resistance elements in the upper and lower faces of the block and use thermostatically controlled electric heating.

As reinforcing filament, any filament which has sufficient modulus or tensile strength to impart the desired reinforcing characteristics to the finished blade and which is of sufficient stiffness to allow it to be fed into the V-grooves in the die block may be used. Suitable filaments are glass fiber, silicon carbide or metal filaments such as boron fibers. Filaments having a diameter of between about 0.0005 and 0.025 inch diameter may be used.

In order to provide for easy removal of the lamella from the die after partial curing or solidification, the die faces are coated with Teflon (polytetrafluorethylene) or other parting material which will prevent sticking of the lamella to the die faces.

When the curing is completed and/or the die has been allowed to cool sufficiently to solidify the binder, the reinforcing filaments are sheared at the end 23 of the die block by simple up or down translation of the block and shear 25 against the face of the die block. The die block is then opened and the lamella is ejected. The apparatus is now ready for fabrication of another lamella.

By fabricating lamellae in the manner just described, there is no waste of the expensive reinforcing filament, as is the case where the lamellae are cut from preformed mats.

THe finished blade is then fabricated in the conventional manner by stacking lamellae after trimming if necessary and curing in a suitable mold.

While the grooves have been shown in longitudinal orientation with respect to the mold, it should be understood that they may be at any angle to the longitudinal axis of the mold or die block.

While the aforesaid operations of inserting the wire stops and filaments can be done by hand, the whole operation above described can be performed by a machine which will in sequence insert the stop wires through a guide into the grooves, feed the filaments into the grooves until they abut the ends of the stop wires, withdraw the lamella profiler and stop wires, move the injection-molding assembly into place against the die block and inject the resin or binder into the die, control the curing or solidifying operation, shear the filaments after the curing operation or chilling of the mold, separate the mold, eject the lamella, and replace the mold in its assembled relationship for fabrication of another lamella.

I claim:

1. Apparatus for fabricating lamellae comprising a split die block having substantially matching parallel grooves formed in matching contoured surfaces of the two halves of the die block, means for feeding individual reinforcing filaments into said grooves while the block is assembled, means for stopping each filament after it has been inserted into the die block a predetermined distance, means for injecting molten binding material into the space formed between said contoured surfaces when the die block is assembled, and means for shearing said filament at the outer surface of the die block.

2. Apparatus in accordance with claim 1 in which said means for stopping each filament are a plurality of stiff wires adapted to be inserted into said grooves from the end opposite from that from which the filaments are inserted.

3. Apparatus in accordance with claim 2 which said wires are mounted in a lamellae profiler adapted to produce a profile at the ends of said wires inserted into said grooves corresponding to that of the desired lamella.

4. Apparatus in accordance with claim 1 in which said contoured surfaces are coated with a parting agent.

5. Apparatus in accordance with claim 4 in which the parting agent is polytetrafluoroethylene.